United States Patent
Watanabe et al.

[11] Patent Number: 6,117,574
[45] Date of Patent: Sep. 12, 2000

[54] TRIBOLUMINESCENT INORGANIC MATERIAL AND A METHOD FOR PREPARATION THEREOF

[75] Inventors: Tadahiko Watanabe, Saga; Chaonan Xu; Morito Akiyama, both of Tosu, all of Japan

[73] Assignee: Agency of Industrial Science and Technology, Tokyo-to, Japan

[21] Appl. No.: 09/173,006

[22] Filed: Oct. 15, 1998

[30] Foreign Application Priority Data

Oct. 20, 1997 [JP] Japan .................................. 9-306499
Oct. 20, 1997 [JP] Japan .................................. 9-306620

[51] Int. Cl.$^7$ .................................................. B32B 17/00
[52] U.S. Cl. ........................................... 428/698; 257/94
[58] Field of Search .......................... 428/698; 438/791; 257/94

[56] References Cited

U.S. PATENT DOCUMENTS

| | | | |
|---|---|---|---|
| 5,306,320 | 4/1994 | Mashimo et al. | 501/96 |
| 5,625,202 | 4/1997 | Chai | 257/94 |
| 5,766,783 | 6/1998 | Utsumi et al. | 428/698 |
| 5,772,328 | 6/1998 | Kronberg | 374/162 |
| 5,850,410 | 12/1998 | Kuramata | 372/43 |
| 6,001,748 | 12/1999 | Tanaka et al. | 438/791 |

FOREIGN PATENT DOCUMENTS 2-38484  2/1990  Japan .

*Primary Examiner*—Francis J. Lorin
*Attorney, Agent, or Firm*—Wenderoth, Lind & Ponack, L.L.P.

[57] ABSTRACT

Provided by the invention is a novel synthetic inorganic triboluminescent material in the form of a powder, sintered block or thin film, of which the matrix phase is a piezoelectric crystalline material of a wurtzite structure such as zinc sulfide and the activator to serve as the center of luminescence is a transition metal element such as manganese, copper and rare earth elements in an amount of 0.01 to 10% by weight. The triboluminescent material is prepared by subjecting a powder blend of the matrix phase material and a thermally decomposable compound of the activator element first to a preparatory calcination treatment at 500 to 800° C. and then, preferably in the form of a powder compact, to a second calcination treatment at 900 to 1700° C., preferably, in vacuum under a sealed condition, when the material is liable to cause sublimation, or in an atmosphere of a reducing gas. The thus obtained triboluminescent material can be used as a source material for the formation of a thin film on a substrate, for example, by ion plating. The efficiency of the triboluminescence is increased by increasing the crystallinity of the material by controlling the conditions of film deposition and/or by undertaking a heat treatment of the thin film as deposited.

7 Claims, 3 Drawing Sheets

TRIBOLUMINESCENT INORGANIC MATERIAL AND A METHOD FOR PREPARATION THEREOF

BACKGROUND OF THE INVENTION

The present invention relates to a novel triboluminescent inorganic material capable of emitting strong luminescence under a mechanical force such as frictional rubbing, impacting and the like or under a mechanical stress as well as to an efficient method for the preparation of such a triboluminescent inorganic material.

As is known, various kinds of inorganic luminescent materials are known and widely employed in practical applications. These conventional inorganic luminescent materials heretofore developed are grossly classified into, first, those emitting luminescence by receiving an electric energy as in the excitation in an electric field or under irradiation with electron beams and, second, those emitting luminescence when irradiated with light of various wavelengths such as ultraviolet and infrared lights and ionizing radiations.

On the other hand, certain inorganic materials known as a triboluminescent material are capable of emitting luminescence by receiving mechanical energy. While several natural materials such as certain kinds of wurtzite minerals are known to be triboluminescent, the intensity of their triboluminescence is so low that no practical application is undertaken and no reports were published heretofore on the research and development works of synthetic inorganic triboluminescent materials which can be used either in the form of a powder or block or in the form of a thin film formed on a substrate. Accordingly, there is a motivation to conduct investigations for the development of a synthetic inorganic triboluminescent material capable of emitting practically usable strong luminescence by excitation with mechanical energy.

SUMMARY OF THE INVENTION

The present invention therefore has an object to provide a synthetic inorganic triboluminescent material capable of emitting luminescence of an intensity suitable for practical applications when excited with mechanical energy as well as to provide a method for the preparation thereof.

Thus, the synthetic inorganic triboluminescent material provided by the present invention comprises a matrix phase of a piezoelectric inorganic crystalline material having a wurtzite structure selected from the group consisting of oxides, sulfides, carbides and nitrides containing a dopant element selected from the group consisting of transition metal elements including rare earth elements to serve as a center of luminescence uniformly distributed in the matrix phase in an amount in the range from 0.01% to 10% by weight.

The above defined inorganic triboluminescent material can be prepared by the method comprising the steps of:

(a) blending a powder of the matrix material with a powder of the dopant element in the form of a thermally decomposable compound to form a powder blend;

(b) subjecting the powder blend to a preparatory calcination treatment at a temperature in the range from 500 to 800° C. for at least 30 minutes; and (c) subjecting the powder blend after the preparatory calcination treatment in step (b) to a second calcination treatment at a temperature in the range from 900 to 1700° C. for at least 60 minutes.

The triboluminescent material obtained by the above described preparation method is usually in the form of a powder or block, from which a thin film of the material can be formed by a known film-forming method such as ion plating.

DETAILED DESCRIPTION OF THE PREFERRED EMBODIMENTS

Figure 1:
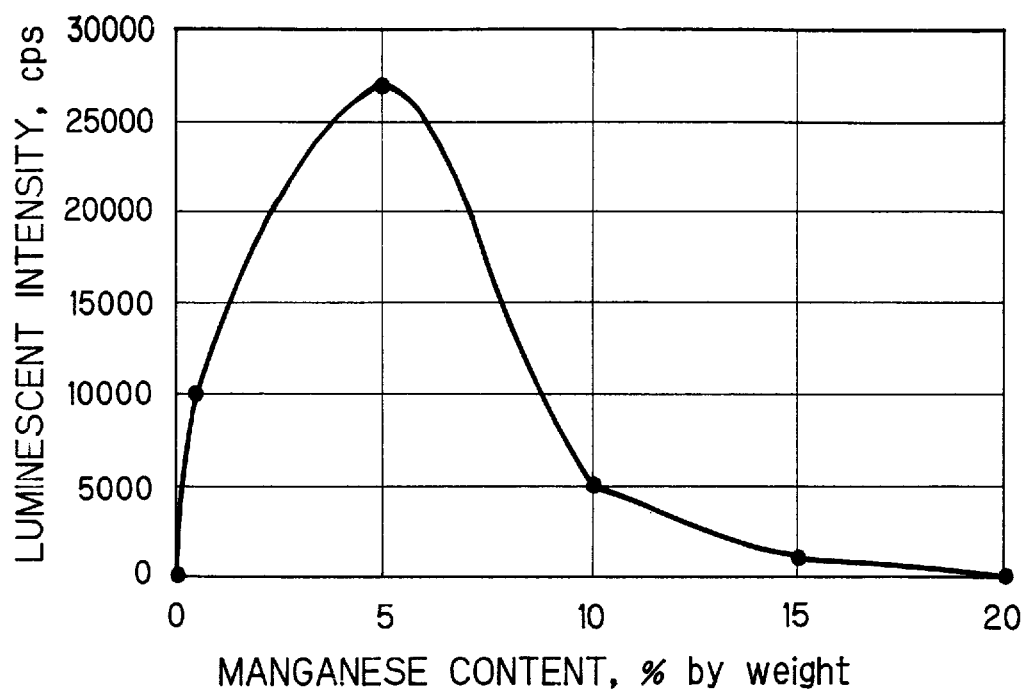
FIG. 1 is a graph showing the relative intensity of the triboluminescence of manganese-doped zinc sulfide as a function of the doping level in Example 1.

As is described above, the synthetic inorganic triboluminescent material of the invention consists of a specific matrix phase and a specific dopant element uniformly dispersed in the matrix phase which acts as the center of luminescence. The matrix material is a piezoelectric inorganic crystalline material of a wurtzite structure. A piezoelectric matrix material generates an electric field by receiving mechanical energy which efficiently excites the center of luminescence. It has been found that a piezoelectric crystalline material emits particularly strong luminescence when the material has a wurtzite structure of the crystal. While the matrix material is selected from the group consisting of inorganic piezoelectric oxides, sulfides, carbides and nitrides, examples of a particularly preferable piezoelectric crystalline material as the matrix phase include beryllium oxide BeO, zinc oxide ZnO, zinc sulfide ZnS, cadmium sulfide CdS, manganese sulfide MnS, aluminum nitride AlN, gallium nitride GaN, indium nitride InN, tantalum nitride TaN, niobium nitride NbN and α-silicon carbide α-SiC, of which zinc sulfide is particularly preferable.

The dopant element is selected from transition metal elements selected from the group consisting of vanadium, chromium, manganese, iron, cobalt, nickel, copper, zinc, niobium, molybdenum, tantalum and tungsten as well as rare earth elements such as cerium, praseodymium, neodymium, samarium, europium, gadolinium, terbium, dysprosium, holmium, erbium, thulium and ytterbium. The efficiency of triboluminescence of the inventive triboluminescent material depends on the combination of the matrix material and the dopant element so that the dopant element should be selected from the elements of the above mentioned group in accordance with the matrix material. A combination of zinc sulfide as the matrix material and manganese as the dopant element is particularly preferable. When the matrix material is zinc oxide, rare earth elements are preferred as the dopant element. The amount of the dopant element in the triboluminescent material is in the range from 0.01 to 10% by weight. When the amount of the dopant element is too small, the efficiency of triboluminescence cannot be high enough while, when the amount thereof is too large, deformation of the crystalline lattice structure of the matrix phase is so large that the efficiency of triboluminescence is also decreased.

The synthetic inorganic triboluminescent material of the invention is prepared from the above mentioned matrix material and the dopant element in the form of a thermally decomposable compound such as carbonates according to the following procedure. Thus, the matrix material in the form of a fine powder and the dopant compound also in the form of a fine powder in a specified proportion are thoroughly mixed together to form a uniform powder blend which is subjected to a preparatory calcination treatment at a temperature in the range from 500 to 800° C. for at least 30 minutes or, preferably, from 30 to 300 minutes, preferably, in an atmosphere of vacuum so that the matrix phase is uniformly doped with the dopant element.

The powder blend after the preparatory calcination treatment is then compression-molded into a powder compact which is subjected to a second calcination treatment at a temperature in the range from 900 to 1700° C. for at least 60 minutes or, preferably, from 60 minutes to 48 hours, preferably, in an atmosphere of vacuum or in an atmosphere of a reducing gas such as hydrogen so that distribution of the dopant element in the crystalline structure of the matrix phase is promoted. If necessary, the thus obtained triboluminescent material is disintegrated into fine particles. The calcination treatment of the powder blend, which is susceptible to sublimation, is performed, preferably, in a sealed condition by sealing in a fused silica glass tube under vacuum so that sublimation of the constituents of the powder blend can be prevented not to affect the doping level with the dopant element. Alternatively, the calcination treatment of the powder blend is conducted in an alumina vessel when the calcination temperature exceeds 1100° C.

A calcination treatment of the powder blend at a higher temperature has an effect of increasing the crystallinity of the material. It has been discovered that the efficiency of the triboluminescence strongly depends on the crystallinity of the matrix phase and is increased, in some cases, by a degree of $10^3$ order as the crystallinity of the matrix phase is increased.

The wavelength, i.e. color, of the triboluminescent light emitted from the inventive triboluminescent material is determined within the visible range by the combination of the matrix material and the dopant element. When the matrix material is zinc sulfide, for example, the color of the triboluminescent light is orange with manganese as the dopant element and blue with copper as the dopant element.

While the synthetic inorganic triboluminescent material prepared by the above mentioned process is usually in the form of a powder or block, it is sometimes desirable that the material is shaped in the form of a thin film on a substrate of a suitable material such as optical glass, fused silica glass, ceramics, carbon and metals. A thin film of the inventive triboluminescent material can be prepared by various known methods including chemical and physical methods, of which the method of ion plating as a kind of physical vapor-phase deposition methods by using the above described triboluminescent material in the form of a block as the source material is preferred in respect of the relatively large rate of film formation and good mechanical strength of the thin film formed thereby.

It is important in this case that the chemical composition of the source material is not affected by the physical film-forming process to cause deviation of the dopant level in the thin film from the target value. In consideration of this problem, it is advisable that the source material is so formulated that the content of the constituent liable to cause deficiency in the thin film as formed is increased by 5 to 10% by moles over the target value. When the constituent liable to cause deficiency in the thin film as formed is a volatile element such as oxygen and nitrogen, for example, the loss of the element in the ion plating process can be compensated by introducing the element in the gaseous form into the atmosphere in which ion plating is conducted.

It is also important that the crystalline defects produced in the thin film by the film-forming procedure is removed so as to increase the crystallinity of the thin film.

An efficient method for the improvement of the crystallinity of the thin film is to subject the triboluminescent material doped with the dopant element as the source material of the thin film to a heat treatment in a controlled atmosphere or, in particular, to the treatment of vacuum-sealed sintering. Namely, the triboluminescent source material and an atmosphere-controlling material are introduced into a fused silica glass tube which is evacuated to high vacuum and fusion-sealed followed by heating to effect sintering of the material. A triboluminescent base material in the form of a powder is compression-molded into a powder compact before sealing into the fused silica glass tube so that the efficiency of the sintering treatment is further improved. Use of such a triboluminescent source material with improved crystallinity is effective to enhance the efficiency of triboluminescence of the resultant thin film of the triboluminescent material formed from the source material. The crystallinity of the triboluminescent thin film can be further improved by subjecting the thin film as formed to a heat treatment, optionally, in the presence of an atmosphere-controlling substance which is, for example, a powder of sulfur when the matrix phase is zinc sulfide liable to cause deficiency in the content of sulfur during the heat treatment. When the crystallinity of the thin film is about the same, it is a trend that a thin film having a larger thickness is more efficient in the triboluminescence. In this regard, it is preferable that the thin film formed on a substrate has a thickness of at least 0.2 $\mu$m. The above mentioned heat treatment for effecting improvement in the crystallinity of the thin film is conducted at a temperature in the range from 300 to 700° C. for at least 30 minutes.

As a method for further increasing the efficiency of luminescence of the inventive triboluminescent material and improving the durability of the luminescence thereof, it is optional that a self-supporting thin film of the inventive triboluminescent material is sandwiched with protective films or an intermediate layer is interposed between the substrate surface and the triboluminescent thin film to improve adhesion therebetween. These multilayered triboluminescent sheet bodies in fact could have an effect of extending the durability of triboluminescence.

In the following, Examples are given to illustrate the synthetic inorganic triboluminescent material of the invention in more detail. Since the intensity of luminescence emitted from the triboluminescent material strongly depends on the strength of the mechanical force applied to the triboluminescent material, it is important in conducting evaluation of the triboluminescent materials to conduct the tests under a constant or well controlled mechanical force. In the following Examples, measurement of the relative luminescent intensity was made under a constant frictional force.

EXAMPLE 1

A powder of zinc sulfide and a powder of manganese carbonate were thoroughly mixed together each in a calculated amount to give up to 20% by weight of varied contents of manganese element in the resultant triboluminescent material. The powder blend was subjected to a preparatory calcination treatment in vacuum by gradually increasing the temperature up to 500° C. and keeping this temperature for 60 minutes. The manganese carbonate was thermally decomposed by this calcination treatment to produce manganese ions to act as the center of luminescence in the matrix phase of zinc sulfide.

In the next place, the powder blend after the preparatory calcination was compression-molded into a powder compact in the form of a disk having a diameter of 30 mm and thickness of 3 mm which was introduced into a fused silica glass tube and sealed therein under vacuum followed by a further calcination treatment at a temperature of 1000° C. for 180 minutes to give a sintered body. This high temperature calcination treatment had an effect to promote entering of the manganese ions into the crystalline lattice structure of zinc sulfide along with an effect of increasing the crystallinity of the zinc sulfide matrix phase. Sublimation of zinc sulfide could be prevented by the calcination treatment in a sealed silica glass tube. The calcination treatment of the powder blend in the form of a powder compact was also advantageous in preventing sublimation of zinc sulfide along with a promoting effect on the entering process of the manganese ions into the crystalline phase of zinc sulfide.

Each of the thus prepared triboluminescent bodies with varied contents of manganese element as the activating dopant was rubbed with a copper probe of 1 mm diameter having a semispherical end point under a load of 500 g and a rubbing velocity of 4 meters per minute to make a measurement of the relative intensity of the orange-colored luminescence caused by excitation under rubbing. The surface roughness $R_{Z\,D}$ of the test sample and the rubbing probe was 1 μm and 0.5 μm, respectively. The relative luminescent intensities obtained by the measurement are shown in the graph of FIG. 1 in cps as a function of the content of the manganese element in the range from 0 to 20% by weight. As is understood from the graph, the luminescent intensity depends on the content of the manganese element and has a maximum at a manganese content of about 5% by weight. When manganese element was not contained, substantially no triboluminescence could be observed with a value as measured of only 10 cps.

EXAMPLES 2 TO 8

Synthetic inorganic triboluminescent materials were prepared in substantially the same manner as in Example 1 for different combinations of the matrix material and the dopant element indicated below. The content of the dopant element was 5% by weight for all of the combinations.

Example 2: zinc sulfide:copper (ZnS:Cu)
Example 3: zinc sulfide:europium (ZnS:Eu)
Example 4: zinc sulfide:cerium (ZnS:Ce)
Example 5: aluminum nitride:manganese (AlN:Mn)
Example 6: silicon carbide:manganese (SiC:Mn)
Example 7: zinc oxide:europium (ZnO:Eu)
Example 8: zinc oxide:manganese (ZnO:Mn)

Figure 2:
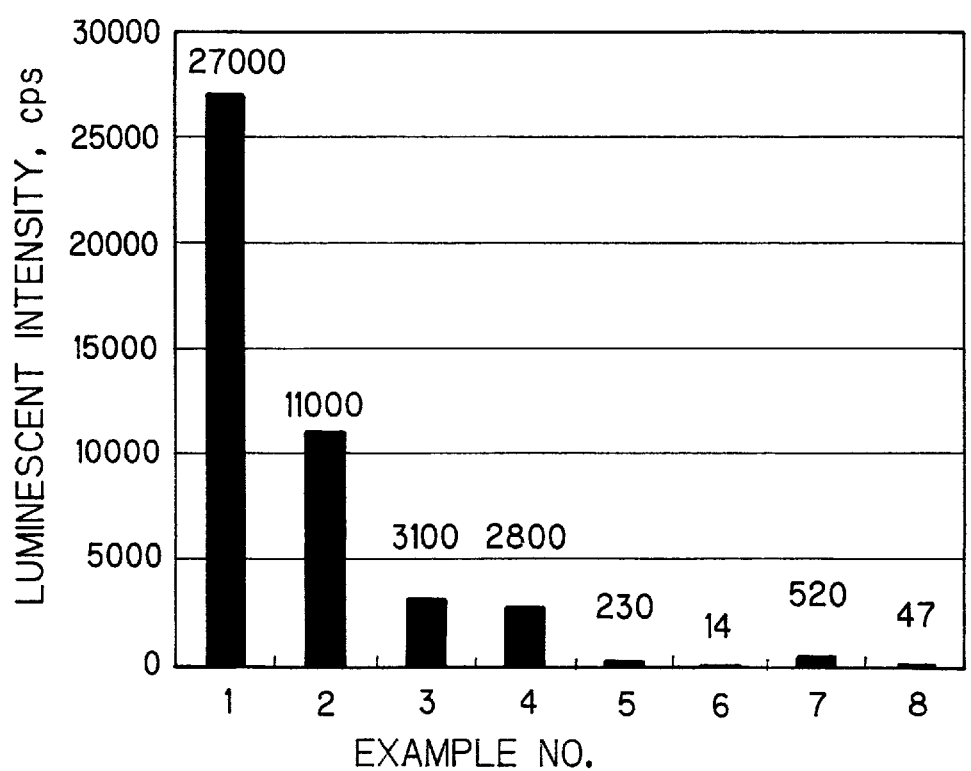
FIG. 2 is a bar chart showing the relative triboluminescent intensity in various triboluminescent materials prepared in Examples 1 to 8 for different combinations of the matrix material and the dopant element.

The results obtained by the measurement of the relative intensities of the triboluminescence undertaken in the same manner as in Example 1 are shown in FIG. 2 by a bar chart including the result of Example 1 for the combination of ZnS:Mn in a dopant content of 5% by weight. The numerical figure on top of each bar chart is the value of the relative intensity in cps as measured. As is clear from FIG. 2, the combination of zinc sulfide and manganese gives the highest intensity of triboluminescence as compared with the other combinations of the matrix material and the dopant element. Zinc sulfide is generally preferable as the matrix material for various dopant elements.

EXAMPLE 9

Synthetic inorganic triboluminescent materials with the combination of zinc sulfide and manganese of varied manganese contents each in the form of a sintered body were prepared in the same manner as in Example 1.

A thin film of the triboluminescent material having a thickness of 3 μm was formed by the method of ion plating on a substrate plate of glass kept at a temperature of 160° C. at a film-forming rate of 20 nm/minute.

Figure 3:
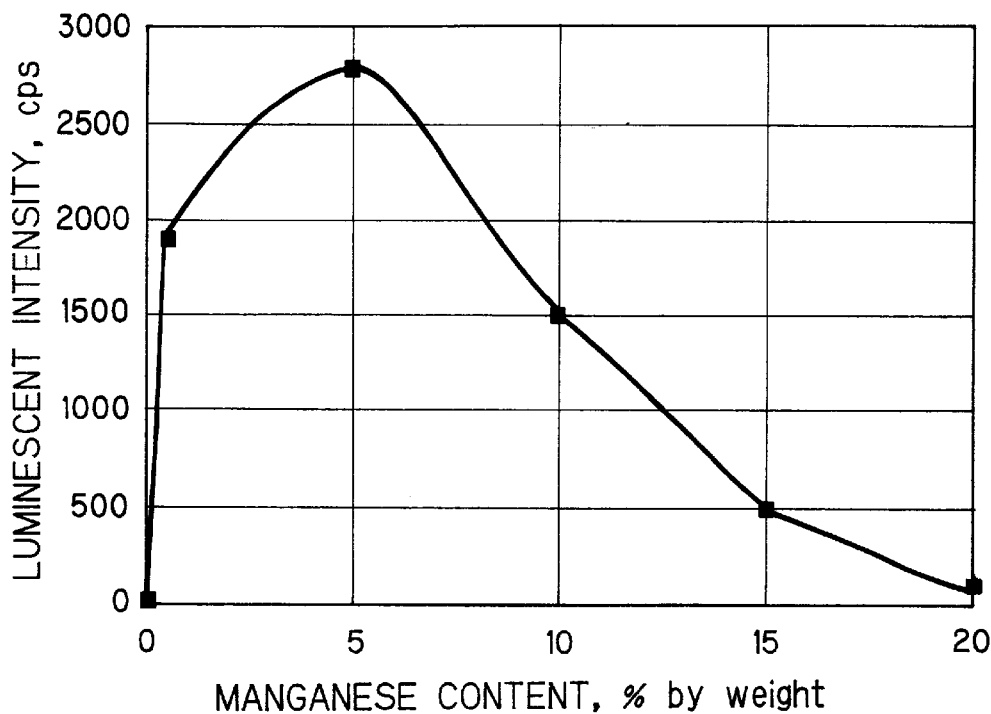
FIG. 3 is a graph showing the relative intensity of the luminescence of manganese-doped zinc sulfide in the form of a thin film as a function of the doping level in Example 9.

The thus prepared triboluminescent materials in the form of a thin film were subjected to the test of the triboluminescent efficiency in the same manner as in Example 1. The relative intensities of the triboluminescence are shown by the graph of FIG. 3 as a function of the content of the manganese element. As is understood by making comparison of FIG. 3 with FIG. 1, the trend of the relative intensity for the thin film samples as a function of the manganese content is generally the same as for the sintered body samples giving a maximum intensity at a manganese content of about 5% by weight.

EXAMPLES 10 TO 16

Synthetic inorganic triboluminescent materials in the form of a thin film were prepared each in substantially the same manner as in Example 9 for different combinations of the matrix material and the dopant element indicated below. The content of the dopant element was 5% by weight for all of the combinations.

Example 10: zinc sulfide:copper (ZnS:Cu)
Example 11: zinc sulfide:europium (ZnS:Eu)
Example 12: zinc sulfide:cerium (ZnS:Ce)
Example 13: aluminum nitride:manganese (AlN:Mn)
Example 14: silicon carbide:manganese (SiC:Mn)
Example 15: zinc oxide:europium (ZnO:Eu)
Example 16: zinc oxide:manganese (ZnO:Mn)

Figure 4:
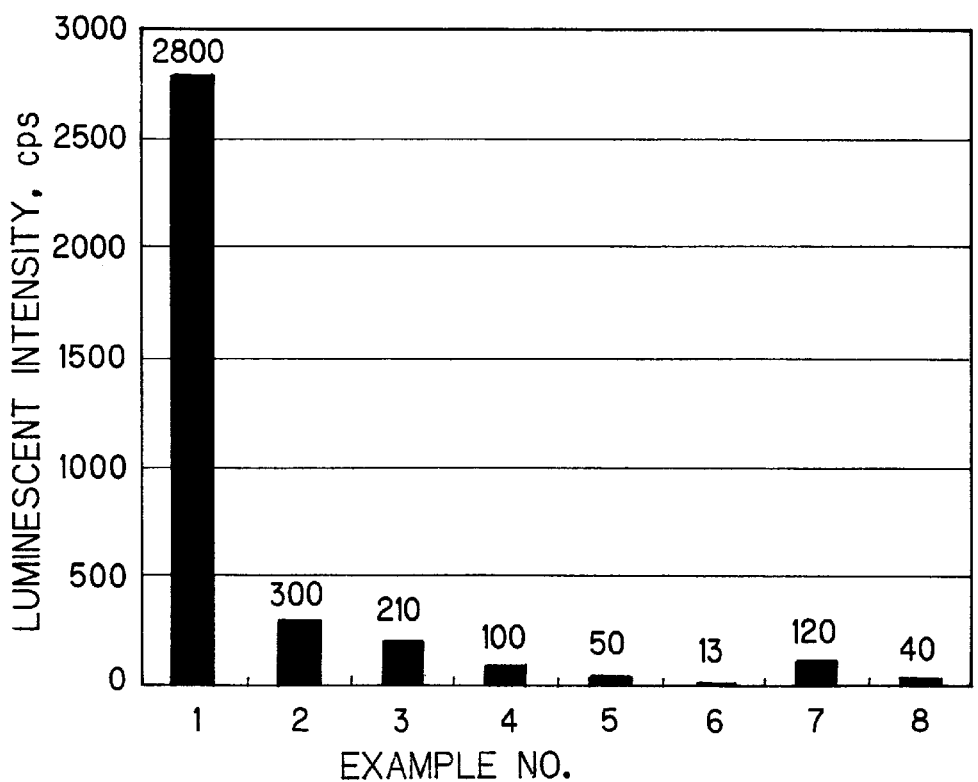
FIG. 4 is a bar chart showing the relative triboluminescent intensity of various triboluminescent materials prepared in Examples 9 to 16 in the form of a thin film for different combinations of the matrix material and the dopant element.

The results obtained by the measurement of the relative intensities of the triboluminescence undertaken in the same manner as in Example 1 are shown in FIG. 4 by a bar chart including the result of Example 9 for the combination of ZnS:Mn. The numerical figure on top of each bar chart is the value of the relative intensity in cps as measured. As is clear from FIG. 4, the combination of zinc sulfide and manganese gives a much higher intensity of triboluminescence than the other combinations of the matrix material and the dopant element.

EXAMPLE 17

Figure 5:
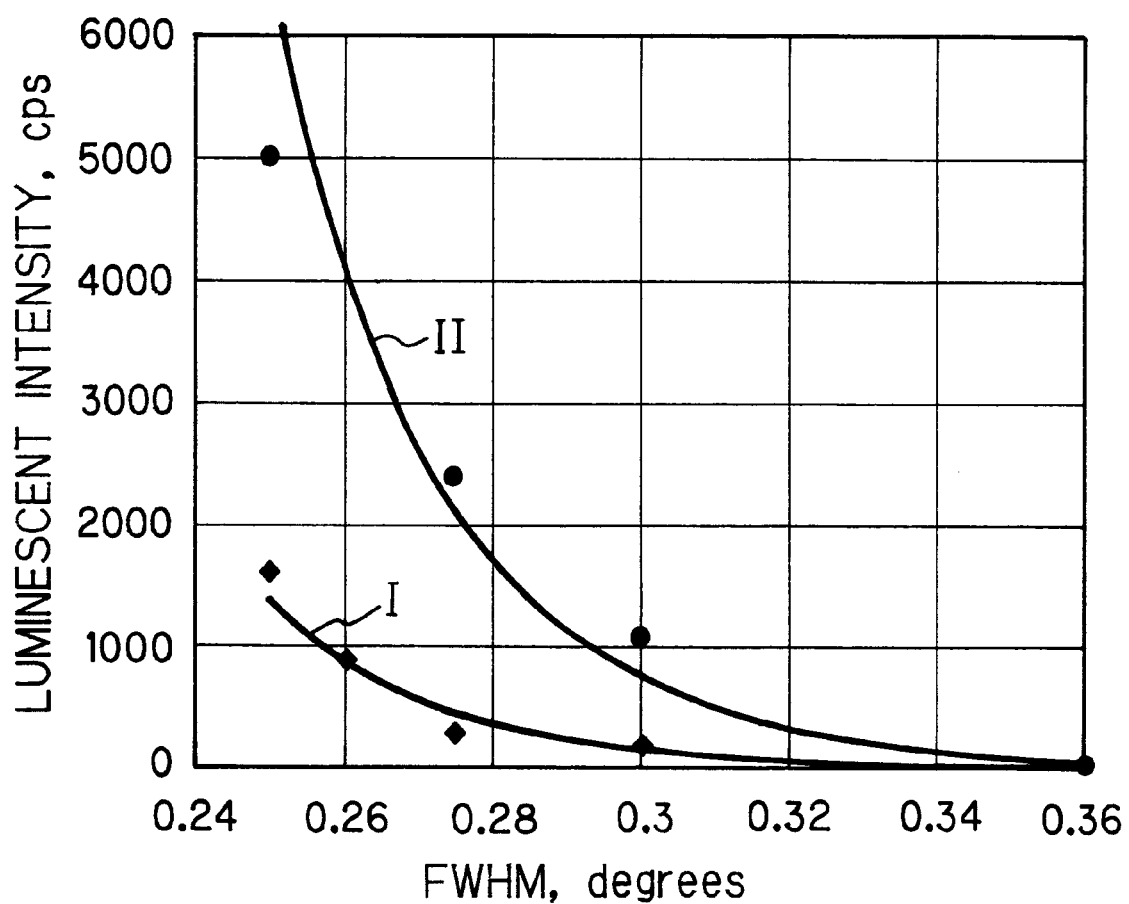
FIG. 5 is a graph showing the relative intensity of the triboluminescence from a triboluminescent thin film as a function of the X-ray diffractometric full width at half maximum (FWHM) of a diffraction peak from the crystallographic (111) lattice plane of zinc sulfide as a measure of crystallinity.

Thin film samples of the triboluminescent material of zinc sulfide:manganese having a thickness of 2 μm or 4 μm were prepared in substantially the same manner as in Example 9 but at a deposition rate varied in the range from 20 to 400 nm/minute with an object to control the crystallinity of the thin films. The samples were subjected to a heat treatment at 300° C. for 30 minutes to modify the crystallinity. With an object to provide a measure of the crystallinity, an X-ray diffractometric diagram was taken with the Cu Kα line for each of the thin film samples and the full width at half maximum (FWHM) in degrees was determined for the peak assignable to the (111) crystallographic lattice plane of zinc sulfide. The relative intensities of the triboluminescence was measured for each of the samples in the same manner as in Example 1 and the results are shown in FIG. 5 as a function of the FWHM of the peak, in which the curves I and II are for the film thickness of 2 μm and 4 μm, respectively. As is understood from FIG. 5, the triboluminescent intensity increases as the crystallinity is increased to give a decreased FWHM of the X-ray diffraction peak.

What is claimed is:

1. A synthetic inorganic triboluminescent material which comprises a matrix phase of a piezoelectric inorganic crystalline material having a wurtzite structure selected from the group consisting of oxides, sulfides, carbides and nitrides and a dopant element selected from the group consisting of transition metal elements as an activator to serve as a center of luminescence uniformly distributed in the matrix phase in an amount in the range from 0.01% to 10% by weight.

2. The synthetic inorganic triboluminescent material as claimed in claim 1 in which the piezoelectric inorganic crystalline material is selected from the group consisting of beryllium oxide, zinc oxide, zinc sulfide, cadmium sulfide, manganese sulfide, aluminum nitride, gallium nitride, indium nitride, tantalum nitride, niobium nitride and α-silicon carbide.

3. The synthetic inorganic triboluminescent material as claimed in claim 2 in which the piezoelectric inorganic crystalline material is zinc sulfide.

4. The synthetic inorganic triboluminescent material as claimed in claim 1 in which the transition metal element is selected from the group consisting of vanadium, chromium, manganese, iron, cobalt, nickel, copper, zinc, niobium, molybdenum, tantalum, tungsten and rare earth elements.

5. The synthetic inorganic triboluminescent material as claimed in claim 4 in which the transition metal element is manganese.

6. The synthetic inorganic triboluminescent material as claimed in claim 4 in which the rare earth element is selected from the group consisting of cerium, praseodymium, neodymium, samarium, europium, gadolinium, terbium, dysprosium, holmium, erbium, thulium and ytterbium.

7. The synthetic inorganic triboluminescent material as claimed in claim 1 which is in the form of a thin film having a thickness of at least 0.2 μm.

* * * * *

UNITED STATES PATENT AND TRADEMARK OFFICE
CERTIFICATE OF CORRECTION

PATENT NO. : 6,117,574
DATED : September 12, 2000
INVENTOR(S) : Tadahiko WATANABE et al.

It is certified that error appears in the above-identified patent and that said Letters Patent is hereby corrected as shown below:

On the cover page, the Assignee information should read: --Japan as represented by Director General of Agency of Industrial Science and Technology--.

Signed and Sealed this

First Day of May, 2001

Attest:

NICHOLAS P. GODICI

*Attesting Officer*　　*Acting Director of the United States Patent and Trademark Office*